(12) United States Patent
Cabanero

(10) Patent No.: US 9,292,667 B1
(45) Date of Patent: Mar. 22, 2016

(54) LOCATION BASED COMMUNITY

(75) Inventor: Christian Robert Cabanero, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 282 days.

(21) Appl. No.: 12/943,703

(22) Filed: Nov. 10, 2010

(51) Int. Cl.
| | |
|---|---|
| *G06F 3/00* | (2006.01) |
| *H04W 24/00* | (2009.01) |
| *H04W 68/00* | (2009.01) |
| *G06F 21/31* | (2013.01) |
| *H04W 64/00* | (2009.01) |
| *G06F 3/048* | (2013.01) |

(52) U.S. Cl.
CPC ............... *G06F 21/31* (2013.01); *H04W 64/00* (2013.01); *G06F 3/048* (2013.01)

(58) Field of Classification Search
None
See application file for complete search history.

(56) References Cited

U.S. PATENT DOCUMENTS

| | | | | |
|---|---|---|---|---|
| 6,938,068 | B1 * | 8/2005 | Kraft et al. ................... | 709/203 |
| 2006/0270419 | A1 * | 11/2006 | Crowley et al. ............ | 455/456.2 |
| 2008/0320084 | A1 * | 12/2008 | Godon et al. ................. | 709/205 |
| 2010/0070554 | A1 * | 3/2010 | Richardson et al. .......... | 709/202 |
| 2011/0082746 | A1 * | 4/2011 | Rice et al. ................... | 705/14.56 |

OTHER PUBLICATIONS

Rantanen, M. et al., "InfoRadar: Gropu and Public Messaging in the Mobile Context", Oct. 2004, ACM, NordiCHI '04, pp. 131-140.*

Konomi, S. et al.; "Askus: Amplifying Mobile Actions"; May 11-14, 2009; 7th International Conference Pervasive 2009, pp. 202-209.*

Espinoza, F. et al., "GeoNotes: Social and Navigational Aspects of Location-Based Information Systems", Oct. 2001, Computer Science vol. 2201, 2001, pp. 2-17.*

Boyd, D. et al., "Tweet, Tweet, Retweet: Conversational Aspects of Retweeting on Twitter", Jan. 2010, System Sciences (HICSS), 2010 43rd Hawaii International Conference on System Sciences, pp. 1-10.*

* cited by examiner

*Primary Examiner* — Stella E Higgs
(74) *Attorney, Agent, or Firm* — Thomas | Horstemeyer, LLP

(57) ABSTRACT

Disclosed are various embodiments for facilitating a location based community. A location associated with a user is identified, as are point of interest in proximity to the location. A question can be received from a user that is related to a point of interest, which can be routed to other users who may be in the same or similar location or have an expertise in a particular subject matter area related to the question.

22 Claims, 8 Drawing Sheets

LOCATION BASED COMMUNITY

BACKGROUND

Virtual communities where users interact can provide a rich source of content as well as targeted information for users who may be seeking answers to various questions submitted to the community. Resultant questions and answers can provide a corpus of information that can be published and leveraged in other ways. Questions and answers in such a community often fail to be targeted to a specific location or other situation of the user.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same. Embodiments of the present disclosure are directed to a virtual community in which users may seek answers or responses to questions that are based at least in part on a location of the user. Embodiments of the disclosure are also directed to systems and methods that facilitate routing of questions submitted by users to others in the community that may have a particular expertise suited to answering the question and that may be located in proximity to a location relevant to the question. Questions can also be routed to other users in the community based on a reputation metric that can be calculated based on a history of interactions of the user with the community.

Figure 1:
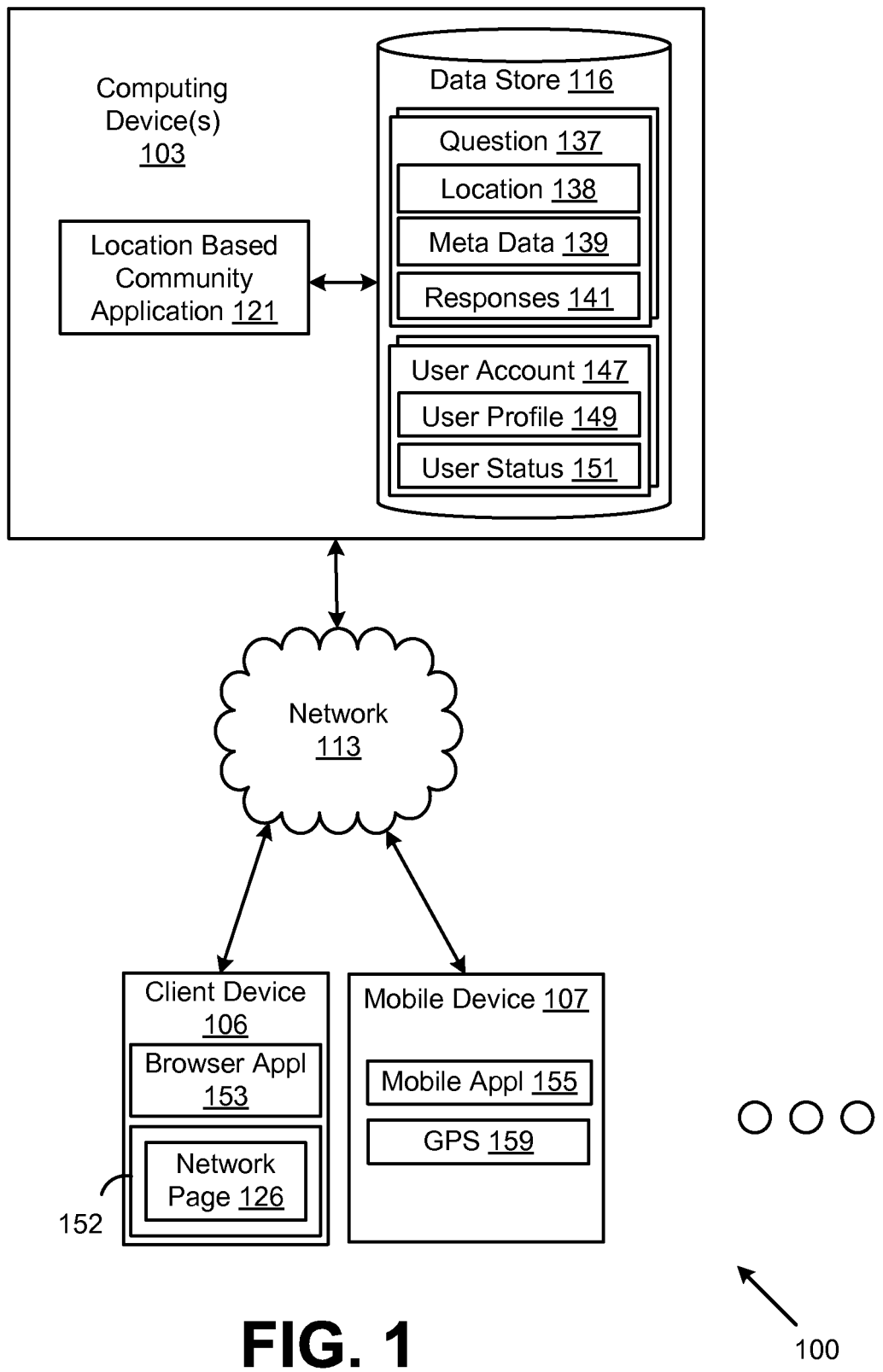
FIG. 1 is a drawing of a networked environment according to various embodiments of the present disclosure.

With reference to FIG. 1, shown is a networked environment 100 according to various embodiments. The networked environment 100 includes at least one computing device 103 in communication with at least one client device 106 and/or at least one mobile device 107. The network 113 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. As one example, each of the disclosed components executed in the computing device 103 can be executed in different computing devices 103 in various locations in one or more data centers. However, for purposes of convenience, the computing device 103 is referred to herein in the singular. Even though the computing device is referred to in the singular, it is understood that a plurality of computing devices 103 may be employed in the various arrangements as described above.

The components executed on the computing device 103 include, for example, a location based community application 121, and other systems, applications, services, processes, engines, or functionality not discussed in detail herein. The location based community application 121 is executed in order to facilitate a virtual community whereby users can ask questions, receive answers to questions, submit answers to questions submitted by other users as well as browse and/or search a corpus of existing questions and answers. The location based community application 121 can publish a question submitted by a user as well as any responses submitted in response to the question by other users. The location based community application 121 can also route questions submitted by users to others who may be associated with a particular location and/or expertise level that may be helpful in arriving at the best answer to a question, as will be described in further detail herein.

With regard to the data store 116, the data stored therein can include, for example, an archive of questions 137 submitted to the community via the location based community application 121. A question 137 can be associated with a location 138 associated with a user submitting the question to the location based community application 121. In some embodiments, the location 138 can specify a geographical region, such as a city or neighborhood. A location 138 can also specify a particular point of interest, such as a retailer location, airport, landmark, and/or numerous other examples as can be appreciated.

Each question 137 can also be associated with meta data 139 that can further facilitate categorization as well as routing of questions 137. In some embodiments, a question 137 can be categorized by using textual data in the question submitted by a user. Questions 137 can also be categorized according to meta data 139 so that they may be located by users of the community potentially seeking answers to similar questions. As one example, meta data 139 associated with a question 137 can include a category within a hierarchical organization structure. As another example, meta data 139 associated with a question 137 can include search terms with which a question 137 can be located by a search engine. Meta data 139 can also include a location, identity, demographic information, language, or other information with which a question 137 can be categorized.

A question 137 in the data store 116 can also be associated with one or more responses 141 that are submitted by other users of a community facilitated by the location based community application 121. In some embodiments, the location based community application 121 can rank the quality of responses 141 submitted by a user in response to a particular question 137. In one example, the location based community application 121 can allow users of the community to vote on the quality of a response 141 and designate a response receiving the highest number of votes as the highest quality response.

The data store 116 can also include data regarding the various user accounts 147 of a virtual community facilitated by the location based community application 121. In some embodiments, each user account 147 can be associated with a user profile 149 that can contain demographic data about the user as well as information regarding the activity and history of the user in the community. As a non-limiting example, a history of questions 137 submitted by and/or answered by a user can be stored in a user profile 149. In some embodiments, a community facilitated by the location based community application 121 can assign reputation points to a user based on the quality of responses submitted by the user in response to questions 137 submitted by other users. In another example, the location based community application 121 can assign an experience level to a particular user based on a length of time the user has participated in the community, a number of responses or answers submitted by the user, responsiveness in submitting responses to questions, and other data as can be appreciated. Other examples of a reputation and/or seniority system can be appreciated and stored in the user profile 149. A user can also be associated with a particular area of expertise based upon categories of questions 137 in which the user is active in submitting responses to user's questions, which can also be stored in a user profile 149. Other examples of data that can be stored in a user profile 149 that can be associated with a user should be appreciated.

A user account 147 can also be associated with a user status 151, which can include various data regarding a user's interactions with the location based community application 121. The user status 151 can include information regarding whether the user is currently communicating with and/or has an active session within the location based community application 121. In other words, the user status 151 can indicate whether a user is logged into a user account associated with the location based community application 121. The user status 151 can also include location data associated with the user. In one embodiment, the location based community application 121 can receive and/or determine location information associated with a client 106 and/or mobile device 107 can store the location information in the user status 151. In this way, the location based community application 121 can determine points of interest that may be in proximity to the location information as well as determine whether questions 137 associated with location 138 data should be routed to the user.

The data store 116 can also include other data related to users and questions, as can be appreciated, but are not necessary to discuss herein for an understanding of the various embodiments of the disclosure. Additionally, it should be appreciated that the data store 116 can be implemented in a separate computing device that may be located in a separate installation or location. The depicted table structure of the data store 116 is one example of how data can be structured therein according to embodiments of this disclosure, as it should be appreciated that data can be structured in many different ways across multiple data stores implemented in various computing devices. Accordingly, it should be appreciated that the depicted data store 116 and the table structure shown therein is but one example given for ease of depiction and explanation of various embodiments of this disclosure.

The client device 106 is representative of a plurality of client devices 106 that may be coupled to the network 113. The client device 106 may comprise, for example, a processor-based system such as a computer system. Such a computer system may be embodied in the form of a desktop computer, a laptop computer, a personal digital assistant, a mobile device (e.g. cellular telephone, smart phone, etc.), set-top box, music players, web pads, tablet computer systems, or other devices with like capability. The client device 106 includes a display device 152 upon which various network pages 126 and other content may be rendered.

The client device 106 may be configured to execute various applications such as a browser application 153 and/or other applications. The browser application 153 may be executed in a client device 106, for example, to access and render network pages 126, such as web pages, or other network content served up by the computing device 103 and/or other servers. The client device 106 may be configured to execute applications beyond a browser application 153 such as, for example, instant message applications, an application specifically tailored to access resources of the computing device 103, and/or other applications as can be appreciated. In embodiments of the present disclosure, a user on a client 106 can submit questions including a root question and a multimedia source as well as browse archived questions 137 and submit responses to questions submitted by other users that are published by the location based community application 121.

Another example of a device that can interact with the location based community application 121 includes a mobile device 107, which can execute a mobile application 155 such as a browser that can render network pages generated by the location based community application 121. In another embodiment, the mobile application 155 can be tailored to access data provided by the location based community application 121 and can include client side code that generates a user interface on a display device of the mobile device 107. Accordingly, a user can submit questions to the location based community application 121 as well as browse and/or submit responses to questions published by the location based community application 121 via the mobile application 155.

The mobile device 107 may comprise a mobile device including cellular telephone and data access, location detection hardware, and other hardware and software components. The mobile device 107 can detect the location of a user using global positioning system 159 (GPS) or other location detection functionality, which can be submitted by the mobile application 155 to the location based community application 121. In one example, global positioning system 159 (GPS) functionality provided by the mobile device 107 can provide a location of the client to the mobile application 155, which can in turn transmit a location of the client to the location based community application 121. In one embodiment, the location based community application 121 can utilize location based services and applications executed on the mobile device 107 to determine a location of the user, which can be associated with a question 137 and/or user status 151.

Next, a general description of the operation of the various components of the networked environment 100 is provided. The following discussion includes non-limiting examples of interactions of users on a client 106 and/or mobile device 107 with a virtual community facilitated by the location based community application 121. In embodiments of this disclosure, the location based community application 121 can facilitate a virtual community in which users can submit questions to be answered, respond to questions submitted by other users as well as browse questions and answers stored in the data store 116 accessible to the location based community application 121.

Accordingly, embodiments of the present disclosure facilitate the submission of questions to a virtual community which can also be associated with a particular location and/or a point of interest. In one embodiment, the location based community application 121 can authenticate a user associated with a user account 147. If, for example, the user is interacting with the location based community application 121 via a mobile application 155 executed on a mobile device 107 that provides location data, the location based community application 121 can update a user status 151 with the location information. In this non-limiting example, the location based community application 121 can determine one or more points of interest in proximity to the location of the user and provide suggestions regarding these points of interest for which a user may have an interest in submitting questions.

For example, a user interacting with the location based community application 121 may be located in a shopping mall. Accordingly, the location based community application 121 can determine from the location of the user provided by the mobile application 155 that the user is presently within the shopping mall and prompt the user, via the mobile application 155, by transmitting a data to the mobile device 107 that includes various retailers in the shopping mall. The location based community application 121 can also ask the user whether the user would like to submit questions to the virtual community regarding these nearby points of interest.

The mobile application 155 can facilitate selection of one or more points of interest and allow a user to submit one or more questions. Accordingly, the location based community application 121 can receive questions from the mobile application 155 regarding points of interest and publish the question in the virtual community. In some embodiments, the location based community application 121 can also route the questions to certain users of the community to facilitate responses efficiently as well as generate responses that are of high quality. To this end, in one embodiment, the location based community application 121 can route questions received from users to other users of the community that may be located at or near a particular location 138 associated with a question 137. In some embodiments, the location based community application 121 can track a user status 151 to determine whether users in the community who are associated with a present and/or recent session in the location based community application 121 are also associated with location data in their associated user status 151 that is near the location 138 associated with the question 137.

Additionally, the location based community application 121 can route questions to other users associated with a reputation metric that makes the user a candidate to generate a high quality response. Accordingly, by examining a user profile 149 associated with the user, the location based community application 121 can determine whether the user has a history of submitting high quality responses 141 to questions 137 in the community. The location based community application 121 also analyzes the subject matter of questions and route these questions to certain users based on whether the user is associated with having a high level of expertise in the subject matter area. In some embodiments, the location based community application 121 can also analyze a user profile 149 and determine whether some users generate responses 141 more quickly than others, and so a reputation metric associated with these users can be increased, as they have a history of being responsive to questions 137 submitted by other users.

The location based community application 121 can also take into account a combination of a location associated with a user and profile characteristics of the user when routing questions. As one example, if a question 137 is associated with a point of interest that can include a consumer electronics retailer, the location based community application 121 can route the question to users having a high level of expertise with consumer electronics from among a subset of these users who may be located in proximity to the retailer described by the point of interest. Accordingly, the location based community application 121 can calculate the reputation metric to facilitate these question routing decisions, which can be based on many factors associated with users in the virtual community. In other words, the reputation metric can express a likelihood that a particular user will efficiently submit a response 141 to a question 137 that is of high quality.

The location based community application 121 can calculate a reputation metric that is associated with each question 137 received in the virtual community. The reputation metric can rank users in the community who are potential answerers of a question according to their location and experience submitting responses 141 in the community. As noted above, the reputation metric can also rank users according to how closely their expertise in various subject matter areas is related to a particular question, which can be determined by analyzing a history of responses 141 submitted by a user in a particular subject matter area as well as the quality of these responses 141 relative to other users. As noted above, other users can vote on the quality of a response 141 submitted by a user, which can be indicative of its quality. Accordingly, as in the above example, if a question 137 received by a user is associated with consumer electronics or a particular retailer, those users in the community who may have a history of submitting high quality responses 141 in the consumer electronics subject matter area and/or with regard to the particular retailer will have a higher reputation metric relative to those who do not.

The reputation metric can also take into account a location associated with the user as well as the user's willingness to submit responses 141 to questions at a given time. Continuing again the above example of a question submitted by a user regarding a particular consumer electronics retailer, those users in the community who are located in proximity to the point of interest will have a higher reputation metric relative to those who are not. The reputation metric can also take into account a user's willingness to answer questions 137 submitted by other users at a given point in time. In one example, the location based community application 121 can determine whether a user is willing to answer questions by determining whether the user is associated with an active session in the location based community application 121.

The reputation metric can also take into account a location history associated with a user. For example, if the user has a history of being associated with a particular location, the user can have a higher reputation metric associated with the particular location regardless of the user's present location. In this way, the local knowledge of a user regarding a particular location can be leveraged to answer questions submitted by various users regarding the location. As one example, a user who may be associated with a history of "checking in" to a particular location can have a high reputation metric associated with the location, even if the question is not related to a particular area of subject matter expertise of the user. Such a location history can be determined based upon user profile data associated with the user, such as a home address or other profile data. As one example, a user who may live in a particular neighborhood can be routed questions regarding points of interest in the neighborhood even if the user is not presently located within the neighborhood.

In the case of a point of interest that is associated with the merchant, the reputation metric can also take into account whether the user is associated with or represents the merchant. The location based community application 121 can provide a merchant verification scheme that allows merchants to verify the authenticity of a user purporting to represent a merchant. Accordingly, upon verification that the user represents the merchant, questions associated with the merchant can be routed to the user, who may answer questions submitted by other users that are related to the merchant. When publishing content from a user designated as a representative of a merchant, the location based community application 121 can publish a user interface element that signals this merchant affiliation to other users.

In other embodiments, the location based community application 121 can prompt the user via a user interface and receive confirmation of the user's willingness to answer questions submitted by other users. A user presently willing to answer questions 137 submitted by other users can be associated with a higher reputation metric than those who are not. A reputation metric calculated for the purposes of routing a particular question 137 can incorporate one or many of the above factors as can be appreciated.

Having generally described various ways in which the location based community application 121 can receive a question 137 that is associated with a location and route the question to other users, reference will now be made to various non-limiting example user interfaces that can be facilitated by the location based community application 121. The following user interfaces are also shown to illustrate additional examples functionality that can be provided in a virtual community facilitated by the location based community application 121.

Figure 2:
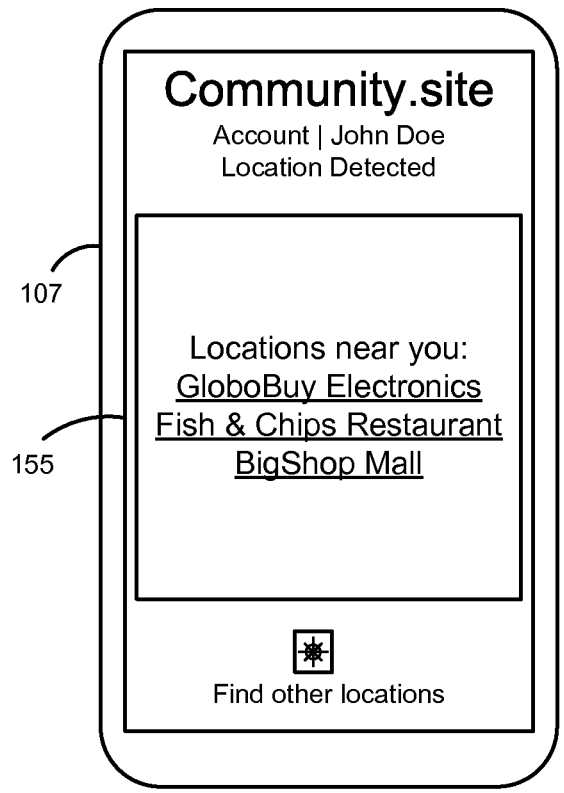
FIGS. 2-10 are drawings of examples of user interfaces rendered by a client in the networked environment of FIG. 1 according to various embodiments of the present disclosure.

Therefore, reference is made to FIG. 2, in which an example user interface or a network page 126 is illustrated that can be rendered by a mobile application 155. The depicted user interface can also depict a network page 126 rendered by a browser application 153 associated with a client 106 in the networked environment 100 of FIG. 1. FIG. 2 illustrates an example user interface rendered on a client 106 and/or a mobile device 107 in which a user can initiate a session in the location based community application 121. In the depicted example, location information associated with the depicted mobile device 107 can be provided to the location based community application 121. In some embodiments, a user on a mobile device 107 can "check in" to a particular geographic location or point of interest. Accordingly, the location based community application 121 can identify points of interest in proximity to the location of the user and provide suggestions regarding these points of interest for which the user can submit questions.

In some embodiments, the location based community application 121 can suggest points of interest in proximity to a location received from a client device 106 or mobile device 107 in which other users have recently checked in and/or are associated with active sessions in the location based community application 121. In other embodiments, the location based community application 121 can suggest points of interest in proximity to the location of a user for which a high volume of questions 137 are received from other users. Other variations of methods which the location based community application 121 can employ to generate suggestions for a user should be appreciated.

Figure 3:
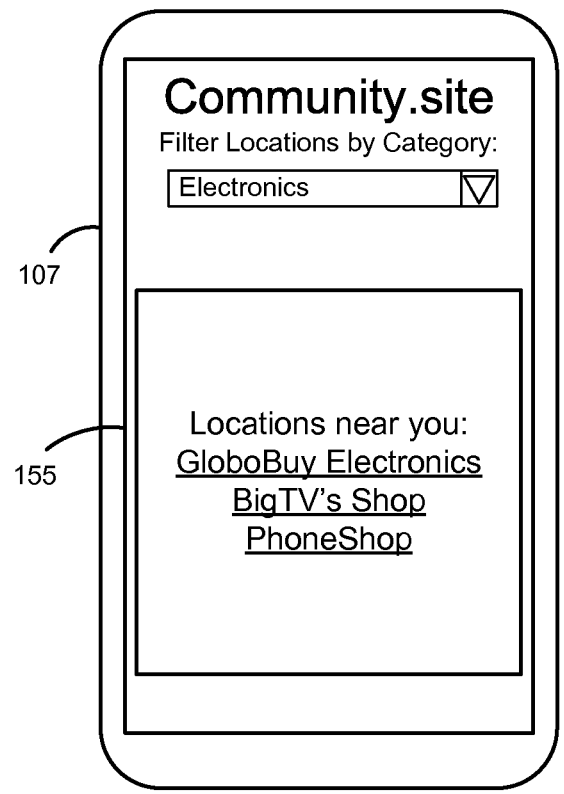

FIG. 3 depicts an alternative user interface that can be generated by the location based community application 121 and rendered by a mobile application 155. In the alternative user interface, the location based community application 121 can allow a user to filter locations or points of interest in proximity to a location associated with the user according to categories that can be specified by meta data 139 associated with questions 137 in the data store 116. In this way, the location based community application 121, upon receiving a location associated with the user, can provide suggestions of points of interest that align with a selection of the user.

Figure 4:
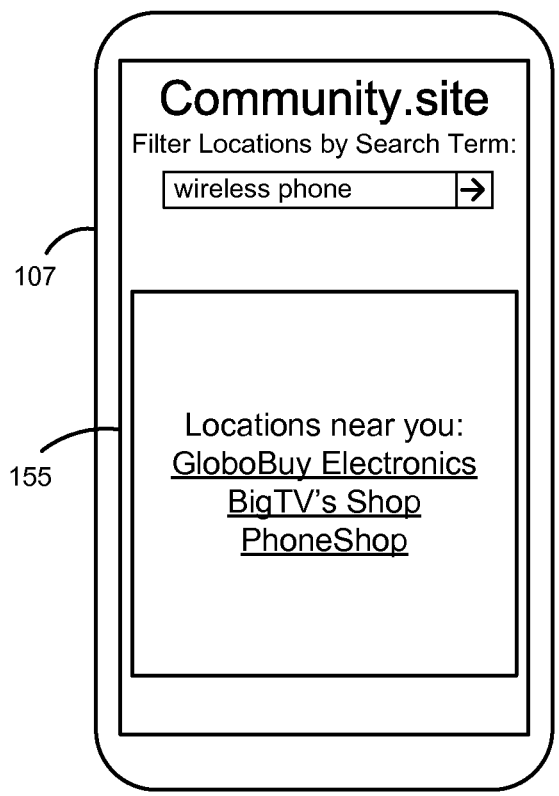

FIG. 4 depicts an alternative user interface that can be generated by the location based community application 121 and rendered by a mobile application 155. In the alternative user interface, the location based community application 121 can allow a user to filter locations or points of interest in proximity to a location associated with the user according to search terms or other test entered by the user in a user interface element. In this way, the location based community application 121, upon receiving a location associated with the user, can filter points of interest that are relevant to search terms entered by the user.

Figure 5:
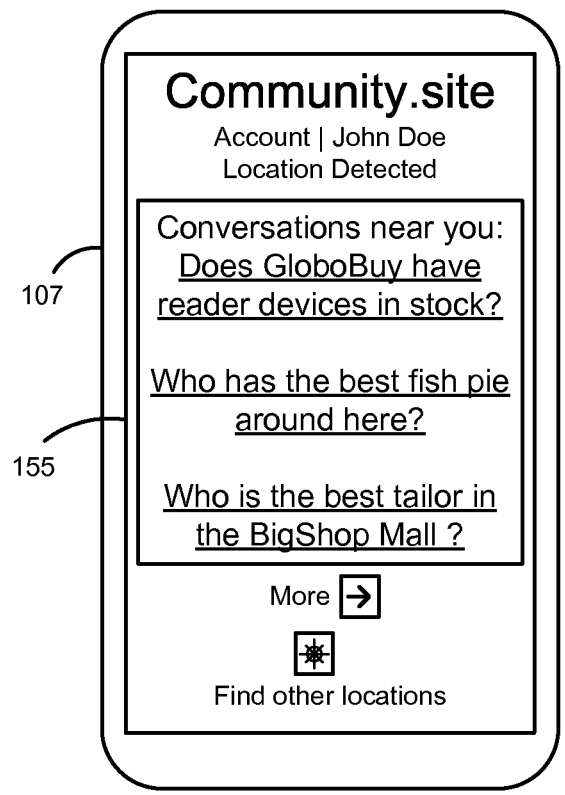

FIG. 5 depicts yet another alternative user interface that can be generated by the location based community application 121 and rendered by a mobile application 155. As noted above, a user can "check in" to a particular geographic location via the mobile application 155. Accordingly, the location based community application 121 can identify questions and/or conversations submitted by other users that are relevant to points of interest in proximity to the location of the user. Accordingly, the location based communication application 121 can provide suggestions regarding these discussions in which the user can participate.

In some embodiments, the location based community application 121 can suggest questions submitted by other users that are related to points of interest in proximity to a location that are particularly active or popular discussions. As one example, the location based community application 121 can identify those questions for which a large number of responses have been submitted relative to other questions. As another example, the suggestions can be based upon interests of the user that can be ascertained based upon user profile data, such as a purchasing history, a history of interactions with the location based community application 121, and other data as can be appreciated. Other variations of methods which the location based community application 121 can employ to generate suggestions for a user should be appreciated.

Figure 6:
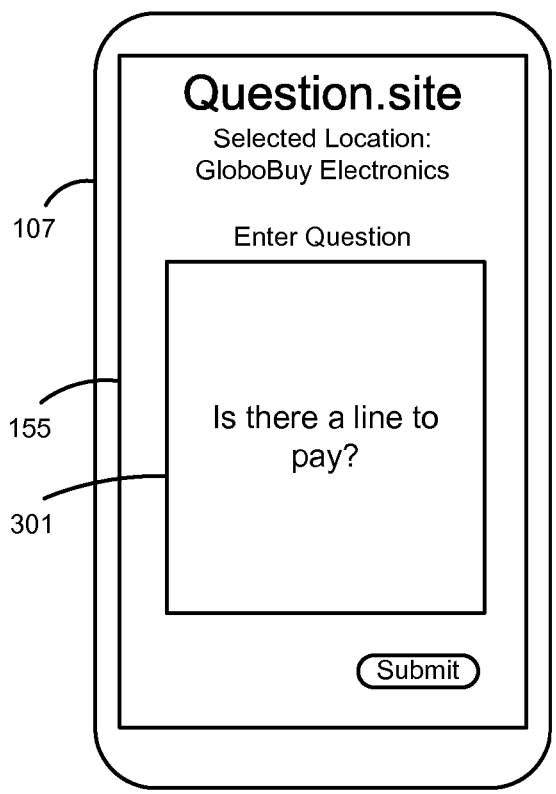

FIG. 6 continues the above examples by depicting a mobile application 155 rendering a user interface in which a user can submit a question that is associated with the location of the user and/or a point of interest selected by the user. In the depicted non-limiting example, a user can enter a question in an entry form that can be submitted via the network 113 to the location based community application 121. Accordingly, the location based community application 121 can store the question 137 as well as the location 138 associated with the question in the data store 116. As described above, the location based community application 121 can define meta data 139 that can be identified with respect to the question by identifying text submitted by the user that can be stored as meta data 139 and with which the question can be categorized or routed. Additionally, the location based community application 121 can store characteristics of the location 138 associated with the question 137 submitted by a user in the data store 116, which can also facilitate categorization and routing of the question 137 by the location based community application 121.

Figure 7:
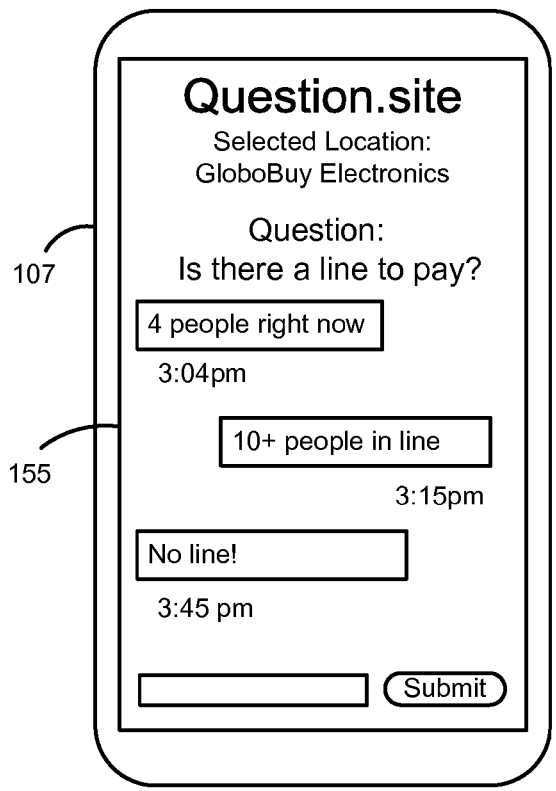

Referring next to FIG. 7, shown is an example of a user interface rendered by a mobile application 155 that depicts one way in which a question 137 submitted by a user can be published by the location based community application 121. In the depicted example, a question 137 as well as a location 138 associated with the question can be published so that other users of a community facilitated by the location based community application 121 can view the question 137 and/or submit a response. In the depicted example, a response can include text input submitted by a user of the community, which can also be published by the location based community application 121. It should be appreciated that in some examples, a response to a question need not be a definitive answer to a question. In some examples a response submitted by a user in response to a question can include another question. In this way, a conversational question and answer community can be developed around the question 137 as well as the location 138 associated with the question 137.

Therefore, the example of FIG. 7 depicts an example of such a conversational question and answer community that can be facilitated by the location based community application 121. By publishing questions as well as responses to those questions in this way, the location based community application 121 can facilitate interaction with other users in proximity to the location 138 associated with the question 137 as well as additional monetization opportunities related to the content. Additionally, such a conversational question and answer interaction facilitate arrival at an answer to a question submitted by the user, even if no single response contains a definitive answer to a question 137, and even if the answer is revealed in multiple responses that are submitted by users and subsequently published.

Figure 8:
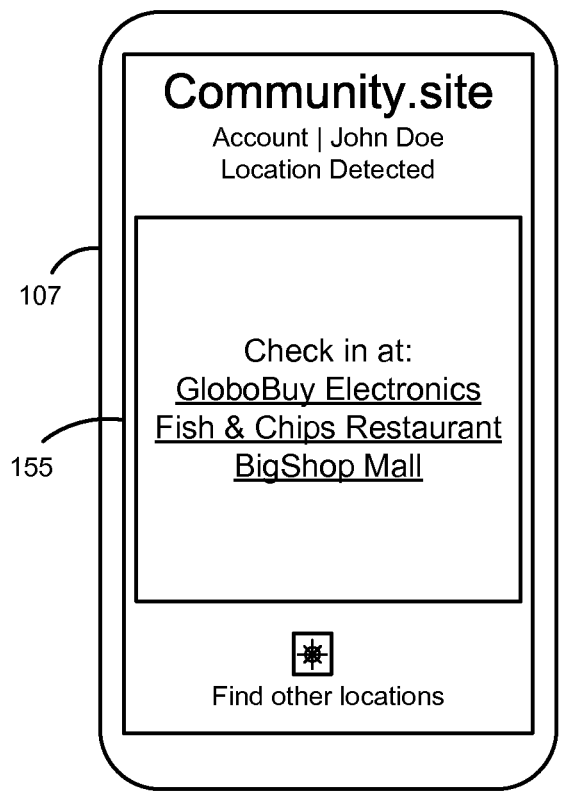
Figure 9:
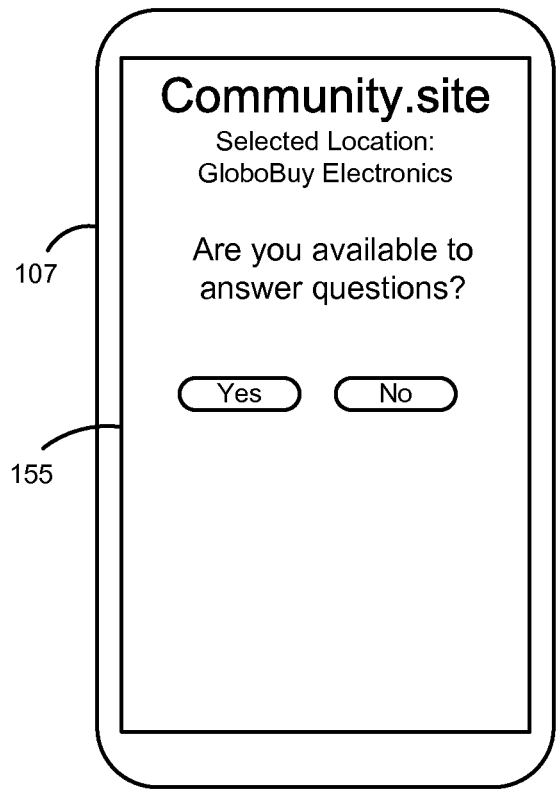

Reference is now made to FIG. 8, which illustrates some additional aspects of the routing of questions 137 to users of a virtual community facilitated by the location based community application 121. In the depicted example of a user interface rendered by a mobile application 155, a user can signal to the location based community application 121 that he or she is available to submit responses to questions by establishing a session with the location based community application 121 that transmits a location associated with a client 106 and/or mobile device 107 associated with the user. In the depicted example, the user can designate a location and/or a point of interest in proximity to a location, and the location based community application 121 can route questions 137 to the user that are associated with the location or point of interest. FIG. 9 continues the example of FIG. 8 by illustrating an example whereby a user can indicate to the location based community application 121 a willingness to answer questions 137 associated with the location 138.

Figure 10:
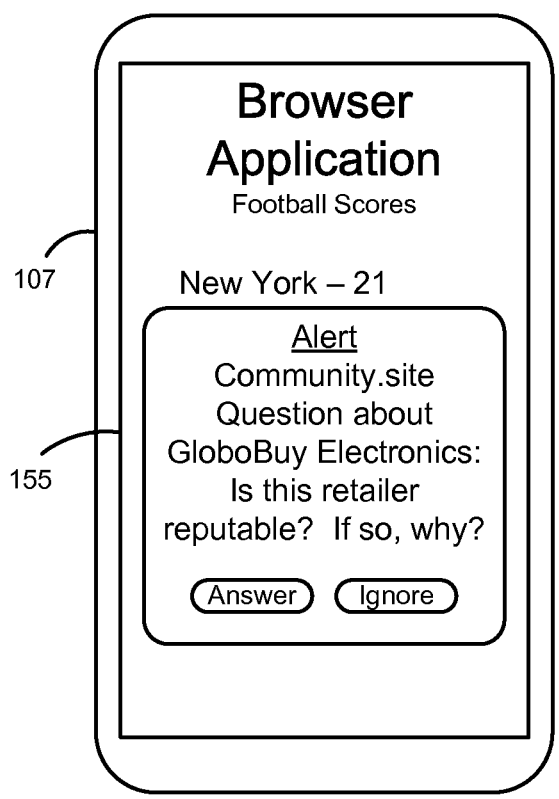

Accordingly, the location based community application 121 can route questions that are associated with the location to such a user. Therefore, reference is now made to FIG. 10, which depicts a user interface rendered by a mobile application 155 that facilitates submission of responses 141 to questions associated with the location 138. In the depicted example, questions 137 can be routed to the user via a text message, background notification, or other notification service or technology provided by a client 106 and/or a mobile device 107 regarding a question 137 submitted by another user of the location based community application 121.

Accordingly, the user may elect to answer or ignore the question 137, which can also facilitate refinement of a reputation metric associated with the user that is calculated with regard to subsequent questions 137 received by the location based community application 121 that are associated with the location 138. In the depicted example, if a user elects to ignore a question 137 routed by the depicted mobile device 107, the location based community application 121 can lower a reputation metric associated with the user for subsequent questions received that are related by the location 138, which can lower the chance that the user will be routed such a subsequent question. Likewise, if the user elects to answer the question 137, the location based community application 121 can raise the reputation metric associated with the user for subsequent questions, which can raise the chance that the user will be routed subsequent questions associated with the location 138.

With regard to routing of questions 137, the location based community application 121 can calculate a reputation metric associated with a particular question 137 and location 138 for users of the community. The users can be ranked according to reputation metric, and the location based community application 121 can route the question 137 to a subset of users having the highest reputation metric. Those users having the highest reputation metric can include users who are associated with an active session via a client 106 and/or mobile device 107 transmitting a location in proximity to the location 138 associated with the question 137. Additionally, users having an extensive history of responsiveness when submitting responses 141 to questions 137 can also have a high reputation metric, as can those users exhibiting a history of submitting high quality answers in a particular subject matter area related to the question 137 subject matter and/or location 138.

Additionally, if an initial routing of a question to a subset of users having the highest reputation metric does not result in receiving a response 141 to the question 137, the location based community application 121 can then route the question to more users until a response 141 to the question 137 is received. In one embodiment, the location based community application 121 can route the question 137 to those users having the next highest reputation metrics after an initial routing of the question 137 to those users having the highest reputation metric.

Figure 11:
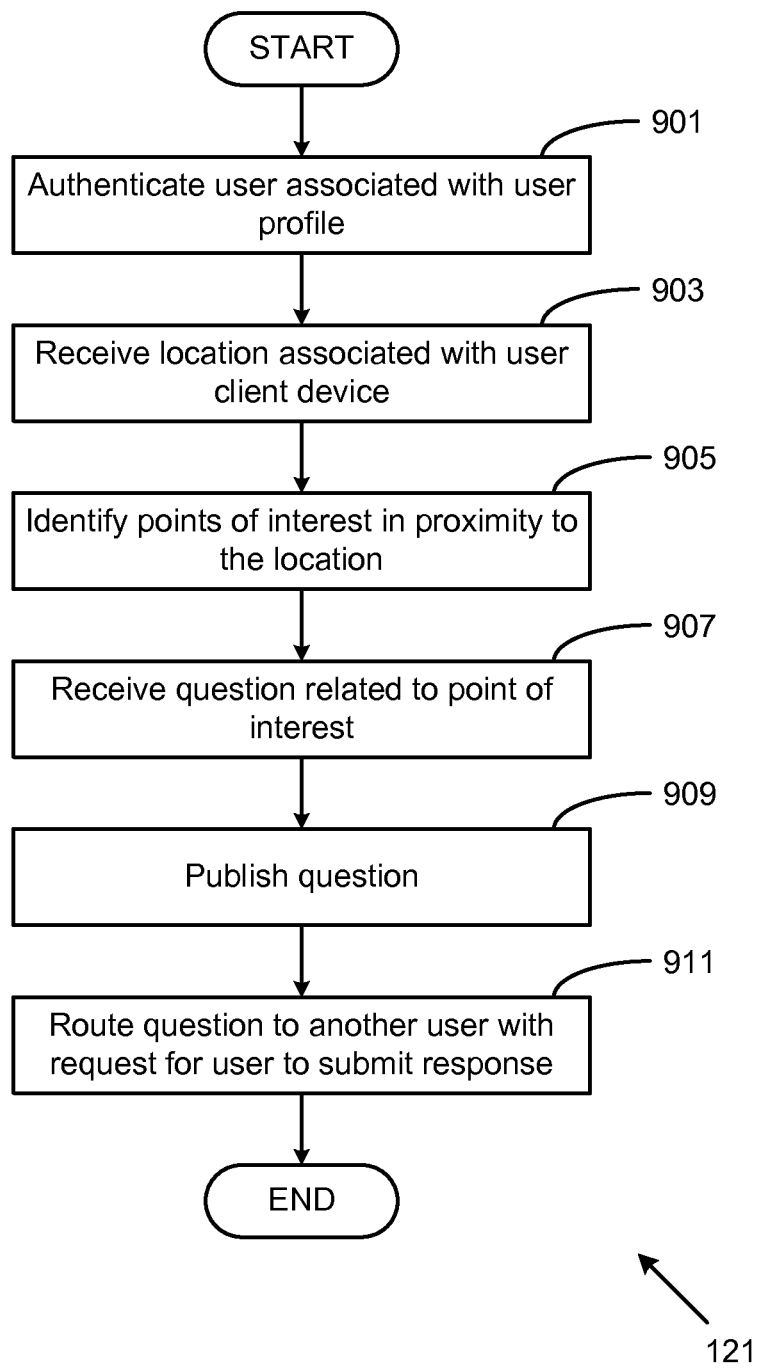
FIG. 11 is a flowchart illustrating one example of functionality implemented as portions of the location based community application executed in a computing device in the networked environment of FIG. 1 according to various embodiments of the present disclosure.

Referring next to FIG. 11, shown is a flowchart that provides one example of the operation of a portion of the location based community application 121 according to various embodiments. It is understood that the flowchart of FIG. 11 provides merely an example of the many different types of functional arrangements that may be employed to implement the operation of the portion of the location based community application 121 as described herein. As an alternative, the flowchart of FIG. 11 may be viewed as depicting an example of steps of a method implemented in the computing device 103 (FIG. 1) according to one or more embodiments.

Beginning with box 901, the location based community application 121 authenticates a user associated with a user profile. In box 903, the location based community application 121 receives a location associated with a client device 106 and/or mobile device 107 associated with the user. In box 905, the location based community application 121 identifies points of interest that are in proximity to the location of the user. In box 907, the location based community application 121 receives a question related to the point of interest, which can be published in a virtual community facilitated by the location based community application 121 in box 909. In box 911, the question is routed to other users of the location based community application 121 to receive a response as described herein.

Figure 12:
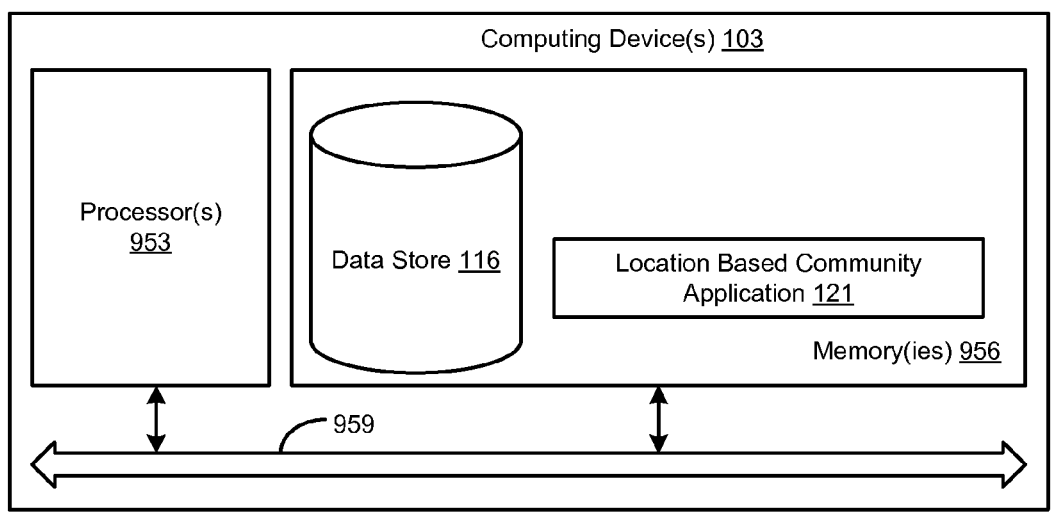
FIG. 12 is a schematic block diagram that provides one example illustration of a computing device employed in the networked environment of FIG. 1 according to various embodiments of the present disclosure.

With reference to FIG. 12, shown is a schematic block diagram of the computing device 103 according to an embodiment of the present disclosure. The computing device 103 includes at least one processor circuit, for example, having a processor 953 and a memory 956, both of which are coupled to a local interface 959. To this end, the computing device 103 may comprise, for example, at least one server computer or like device. The local interface 959 may comprise, for example, a data bus with an accompanying address/control bus or other bus structure as can be appreciated.

Stored in the memory 956 are both data and several components that are executable by the processor 953. In particular, stored in the memory 956 and executable by the processor 953 are the location based community application 121 and potentially other applications. Also stored in the memory 956 may be a data store 116 and other data. In addition, an operating system may be stored in the memory 956 and executable by the processor 953.

It is understood that there may be other applications that are stored in the memory 956 and are executable by the processors 953 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 956 and are executable by the processor 953. In this respect, the term "executable" means a program file that is in a form that can ultimately be run by the processor 953. Examples of executable programs may be, for example, a compiled program that can be translated into machine code in a format that can be loaded into a random access portion of the memory 956 and run by the processor 953, source code that may be expressed in proper format such as object code that is capable of being loaded into a random access portion of the memory 956 and executed by the processor 953, or source code that may be interpreted by another executable program to generate instructions in a random access portion of the memory 956 to be executed by the processor 953, etc. An executable program may be stored in any portion or component of the memory 956 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 956 is defined herein as including both volatile and nonvolatile memory and data storage components. Volatile components are those that do not retain data values upon loss of power. Nonvolatile components are those that retain data upon a loss of power. Thus, the memory 956 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 953 may represent multiple processors 953 and the memory 956 may represent multiple memories 956 that operate in parallel processing circuits, respectively. In such a case, the local interface 959 may be an appropriate network 113 (FIG. 1) that facilitates communication between any two of the multiple processors 953, between any processor 953 and any of the memories 956, or between any two of the memories 956, etc. The local interface 959 may comprise additional systems designed to coordinate this communication, including, for example, performing load balancing. The processor 953 may be of electrical or of some other available construction.

Although the location based community application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 11 shows the functionality and operation of an implementation of portions of the location based community application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 953 in a computer system or other system. The machine code may be converted from the source code, etc. If embodied in hardware, each block may represent a circuit or a number of interconnected circuits to implement the specified logical function(s).

Although the flowchart of FIG. 11 shows a specific order of execution, it is understood that the order of execution may differ from that which is depicted. For example, the order of execution of two or more blocks may be scrambled relative to the order shown. Also, two or more blocks shown in succession in FIG. 11 may be executed concurrently or with partial concurrence. Further, in some embodiments, one or more of the blocks shown in FIG. 11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the location based community application 121, that comprises software or code can be embodied in any non-transitory computer-readable medium for use by or in connection with an instruction execution system such as, for example, a processor 953 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
    at least one computing device comprising at least one hardware processor; and
    an application executable in the at least one computing device, the application comprising program instructions that, when executed by the at least one computing device, cause the at least one computing device to:
        receive a location associated with a first client device;
        receive a selection of at least one point of interest presented on the first client device, the at least one point of interest being presented on the first client device based on the at least one point of interest being in proximity to the location;
        identify a plurality of questions to present on the first client device in response to the selection of the at least one point of interest, the plurality of questions being previously submitted by at least one of a plurality of users in association with the at least one point of interest;
        generate a first user interface for rendering on the first client device that includes at least a portion of the plurality of questions for simultaneous display;
        receive a selection of at least one of the plurality of questions from the first client device;
        generate a second user interface that comprises a first form that obtains text input from the first client device as a response to the at least one of the plurality of questions selected;
        make the text input obtained from the first client device in association with the at least one of the plurality of questions selected accessible to at least one of the plurality of users other than a user associated with the first client device;
        generate a third user interface that comprises a second form that obtains a newly submitted question in association with the at least one point of interest selected;
        publish the newly submitted question;
        identify a user profile that is qualified to answer the newly submitted question based at least in part on whether a location history associated with the user profile includes the at least one point of interest and whether a reputation metric associated with the user profile meets a threshold; and
        route the newly submitted question to a second client device associated with the user profile.

2. The system of claim 1, wherein the program instructions that cause the at least one computing device to identify the user profile further comprises program instructions that, when executed, cause the at least one computing device to identify the second client device as being associated with the user profile, the second client device being in proximity to the location.

3. The system of claim 1, wherein the reputation metric is based at least in part on a history of responses submitted in association with the user profile.

4. The system of claim 3, wherein the reputation metric is based at least in part on a number of points awarded to the user profile by at least a portion of the plurality of users, the number of points being awarded based at least in part on a quality level of the history of responses submitted.

5. The system of claim 1, wherein the reputation metric is based at least in part on an expertise designated in association with the user profile, the expertise being in a subject matter area associated with the newly submitted question.

6. The system of claim 1, wherein the reputation metric is based at least in part on an average response time associated with the user profile.

7. The system of claim 1, wherein the reputation metric is based at least in part on a respective location designated in association with the user profile.

8. The system of claim 1, wherein the program instructions that cause the at least one computing device to identify the user profile further comprises program instructions that, when executed, cause the at least one computing device to:
    rank individual ones of the plurality of users according to a respective reputation metric; and
    route the newly submitted question to a subset of the plurality of users based at least in part on whether the respective reputation metric of the individual ones of the plurality of users in the subset meets a predefined threshold.

9. The system of claim 8, wherein the program instructions that cause the at least one computing device to route the newly submitted question to the subset of the plurality of users further comprises program instructions that, when executed, cause the at least one computing device to:
    route the newly submitted question to a first portion of the plurality of users in the subset; and
    route the newly submitted question to a second portion of the plurality of users in the subset when the first portion of the plurality of users does not submit a response to the newly submitted question within a predetermined amount of time.

10. The system of claim 9, wherein the program instructions that cause the at least one computing device to route the newly submitted question to the subset of the plurality of users further comprises program instructions that, when executed, cause the at least one computing device to:
    communicate the newly submitted question to a highest ranked portion of the plurality of users in the subset; and
    successfully communicate the newly submitted question to a next highest ranked portion of the plurality of users in the subset until a response to the newly submitted question is received.

11. The system of claim 1, wherein the application further comprises program instructions that, when executed, cause that least one computing device to:
    receive at least one response associated with the newly submitted question from the second client device associated with the user profile; and
    publish the at least one response by making the at least one response accessible to the at least one of the plurality of users other than a user associated with the second client device.

12. A computer-implemented method, comprising:
- accessing, by at least one computing device that comprises at least one hardware processor, a location associated with a first mobile device of a user;
- receiving, by the at least one computing device, a selection of at least one point of interest presented on the first mobile device, the at least one point of interest being presented on the first mobile device based on the at least one point of interest being in proximity to the location;
- identifying, by the at least one computing device, a plurality of questions to present on the first mobile device in response to the selection of the at least one point of interest, the plurality of questions being previously submitted by a plurality of users in association with the at least one point of interest;
- generating, by the at least one computing device, a first user interface for rendering on the first mobile device, the first user interface comprising at least a portion of the plurality of questions encoded for concurrent display;
- receiving, by the at least one computing device, a selection of at least one of the plurality of questions from the first mobile device;
- generating, by the at least one computing device, a second user interface in response to the selection of the at least one of the plurality of questions, the second user interface comprising a first form that obtains text input via the first mobile device as a response to the at least one of the plurality of questions selected;
- making, by the at least one computing device, the text input obtained from the first mobile device in association with the at least one of the plurality of questions selected accessible to at least one of the plurality of users other than a user associated with the first mobile device;
- generating, by the at least one computing device, a third user interface that comprises a second form that obtains a newly submitted question in association with the at least one point of interest selected;
- publishing, by the at least one computing device, the newly submitted question;
- identifying, by the at least one computing device, a user profile associated with a qualified user qualified to answer the newly submitted question, the user profile being identified based at least in part on a reputation metric and a location history associated with the user profile; and
- routing, by the at least one computing device, the newly submitted question to a second mobile device associated with the user profile.

13. The computer-implemented method of claim 12, wherein the reputation metric is based at least in part on a history of responses submitted in association with the user profile.

14. The computer-implemented method of claim 13, wherein the reputation metric is based at least in part on a number of points awarded to the user profile by at least a portion of the plurality of users, the number of points being awarded based at least in part on a quality level of the history of responses submitted.

15. The computer-implemented method of claim 12, wherein the reputation metric is based at least in part on an expertise designated in association with the user profile, the expertise being in a subject matter area associated with the newly submitted question.

16. The computer-implemented method of claim 12, wherein the reputation metric is based at least in part on an average response time associated with the user profile.

17. The computer-implemented method of claim 12, wherein routing the newly submitted question to the second mobile device associated with the user profile further comprises transmitting, by the at least one computing device, the newly submitted question to at least one additional mobile device in response to a response to the newly submitted question not being received from the second mobile device within a predetermined amount of time.

18. The computer-implemented method of claim 12, wherein identifying the user profile associated with the second mobile device further comprises ranking, by the at least one computing device, at least a portion of the plurality of users according to a respective reputation metric assigned to individual ones of the plurality of users.

19. The computer-implemented method of claim 18, further comprising:
- transmitting, by the at least one computing device, the newly submitted question to a highest ranked one of the plurality of users in the portion; and
- successively transmitting, by the at least one computing device, the newly submitted question to a next highest ranked one of the plurality of users in the portion until a response to the newly submitted question is received.

20. The computer-implemented method of claim 12, further comprising:
- publishing, by the at least one computing device, the newly submitted question by making the newly submitted question accessible to at least one of the plurality of users other than a user associated with the first mobile device; and
- publishing, in the at least one computing device, at least one response to the newly submitted question by making the at least one response accessible to at least a portion of the plurality of users other than a user that submitted the at least one response.

21. The computer-implemented method of claim 12, wherein the location history comprises a history of association with the at least one suggested point of interest.

22. A non-transitory computer-readable medium embodying a program executable in a computing device by at least one hardware processor, the program comprising program instructions that, when executed by the computing device, cause the computing device to:
- access a location associated with a first client device received from the first client device;
- identify a selection of at least one point of interest presented on the first client device based on the at least one point of interest being in proximity to the location;
- identify a plurality of questions to present on the first client device in response to the selection of the at least one point of interest, the plurality of questions being previously submitted by a plurality of users in association with the at least one point of interest;
- generate a first user interface for rendering on the first client device that includes at least a portion of the plurality of questions for concurrent display;
- access a selection of the at least one of the plurality of questions received from the first client device;
- generate a second user interface that comprises a first form configured to obtain an input from the first client device as a response to the at least one of the plurality of questions selected;
- publish the input obtained from the first client device in association with the at least one of the plurality of questions selected by making the input accessible to at least one of the plurality of users other than a user associated with the first client device;

generate a third user interface that comprises a second form that obtains an additional input, wherein the additional input comprises a newly submitted question associated with the at least one point of interest selected;

publish the newly submitted question;

query a data store to identify a user profile being associated with a user of a second client device qualified to answer the newly submitted question based at least in part on whether the user has a history of being associated with the at least one point of interest and whether a reputation metric of the user profile meets a predefined threshold indicating a reliability of the user; and route the newly submitted question to a second client device associated with the user profile.

* * * * *